United States Patent Office 2,710,195
Patented June 7, 1955

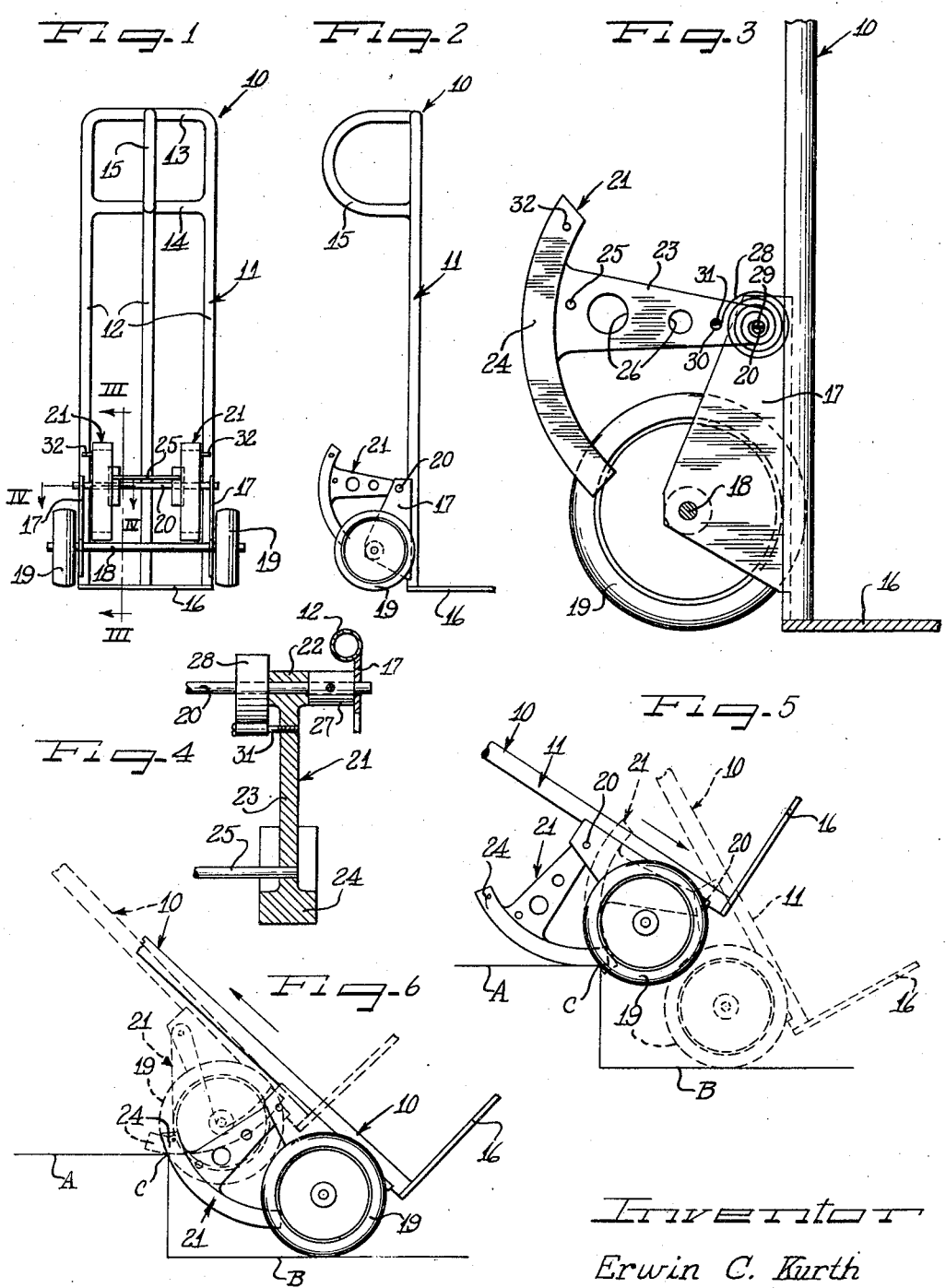

2,710,195

HAND TRUCK PROVIDED WITH ABUTMENT ASCENDING ROCKER ASSEMBLY

Erwin C. Kurth, Chicago, Ill., assignor to Banner Equipment Company, Chicago, Ill., a corporation of Illinois Application January 4, 1952, Serial No. 264,906

1 Claim. (Cl. 280—5.24)

This invention relates to a hand truck or cart equipped with a rocker or runner assembly which will facilitate movement over curbs, steps and the like precipices. Specifically this invention deals with a rocker assembly for two wheeled hand trucks to swingably support the truck as it is raised or lowered over a step or curb.

According to this invention a hand truck having a body or frame supported at one end thereof by a pair of wheels, has rockers pivoted thereon adjacent the wheels and positioned to engage the edge of a step or curb to swing the truck about the edge and thereby facilitate the movement of the truck over the curb or step either in an upward or downward direction. The rocker assembly is conveniently pivoted on the same frame support which mounts the wheels of the truck. Spring means are provided to return the rockers to a neutral out of the way position so as not to interfere with movement of the truck on its wheels along the ground.

The rocker assembly of this invention enables the hand truck to roll about the edge of a stair tread rather than slide over the stair risers to strike against the stair nosings. This saves wear and tear on the stairway and also protects articles being conveyed on the truck against damage by impact and shock. In addition the service life of the truck is lengthened since the truck is not jarred or impacted in use on stairways and the like.

The invention makes possible the use of relatively small diameter wheels on hand trucks since heretofore the wheel diameter had to be large enough to travel over stairs and curbs. It should be understood, however, that the rocker attachment of this invention does not in any way limit the wheel size of the truck since large diameter wheels can be used if desired.

It is then an object of this invention to provide a hand truck which will readily swing over curbs, stairs and the like precipices without jarring or impacting either the truck or material supported on the truck.

Another object of this invention is to provide a rocker assembly for hand trucks to facilitate movement of the trucks over curbs, steps and the like.

A still further object of this invention is to provide a lift attachment for hand trucks and carts which will swing the trucks or carts over curbs and steps and prevent banging of the wheels as heretofore encountered.

A still further object of the invention is to provide a rocker assembly for hand trucks which will swing the trucks over precipices and which will move to an out of the way position when the trucks are operated over even ground.

Another specific object of this invention is to provide a rocker assembly for hand trucks which is pivotally mounted on the wheel supports for such trucks and has spring means returning the rockers to an out of the way position after each use.

Other and further objects of this invention will be apparent to those skilled in the arts from the following detailed sheets of drawings which, by way of a preferred example only illustrate one embodiment of this invention.

On the drawings:

Figure 1 is a rear elevational view of a hand truck equipped with a rocker assembly according to this invention;

Figure 2 is a side elevational view of the truck in Figure 1;

Figure 3 is an enlarged fragmentary vertical cross-sectional view, with parts in side elevation, taken along the line 3—3 of Figure 1;

Figure 4 is an enlarged fragmentary transverse cross-sectional view, with parts in elevation, taken along the line 4—4 of Figure 1;

Figure 5 is a view illustrating the operation of the rockers in swinging the truck downwardly over a precipice.

Figure 6 is a view similar to Figure 5 but illustrating the operation of the rockers in swinging upwardly over a precipice.

As shown on the drawings:

In Figures 1 and 2 the reference numeral 10 designates generally a two wheel hand truck according to this invention for supporting barrels, cases, baggage and the like. The truck 10 includes a rectangular frame or body 11 composed of three longitudinally extending tubes 12 in spaced parallel relation and connected at one end by a transverse tube 13. A second transverse tube 14 connects the tubes 12 in spaced relation from the the tube 13 and a U-shaped handle 15 is joined to the mid-points of the tubes 13 and 14 and extends backwardly from the tubes 12 as shown in Figure 2. The opposite ends of the tubes 12 are secured to a support plate or ledge 16 which projects at right angles from the tubes in a forward direction to form a supporting shelf for material to be carried by the truck.

The outer tubes 12 have side plates 17 of generally triangular shape welded thereto adjacent the ledge 16 and projecting rearwardly from the tubes. The projecting apices of these plates 17 receive an axle 18 therethrough and the ends of the axle extend beyond the sides of the frame to receive wheels 19 thereon. As shown in Figure 2, these wheels 19 are rearwardly of the body 11 and preferably are sufficiently small in diameter so that the end plate 16 can rest flat on the ground to receive the goods thereon. Likewise the wheels preferably do not project above the level of the frame 11 so as not to interfere with the goods stacked on the frame.

According to this invention, the second axle 20 is carried by the side plates 17 preferably at the upper ends of the plates. The axle 20 extends transversely across the frame 11 rearwardly of the frame but closer to the frame than the axle 18. A pair of rockers 21 is mounted on the axle 20. Each rocker 21, as best shown in Figure 4, has a hub portion 22 freely receiving the axle 20 therethrough, a web portion 23 projecting from the hub 22 and an arcuate foot portion 24 on the end of the web portion. The webs 23 of the rockers 21 are connected adjacent the feet 24 by a cross rod 25 so that both rockers 21 must swing in unison. As shown in Figure 3, the web portion 23 of each rocker can have apertures 26 therein to reduce the weight of the assembly.

The cross rod 25 will tie the rockers 21 together and hold them in fixed spaced relation. In order to center the rockers on the shaft 20 bushings or spacer sleeves 27 are disposed on the shaft between the hub 22 and the plate 17, as best shown in Figure 4. Obviously these spacers could be integral with the hub 22 if desired.

Spirally coiled springs 28 are mounted on the shaft 20 adjacent each rocker hub 21. The inner end 29 of each spirally coiled spring 28 is anchored to the shaft. The outer end 30 of each spring 28 is anchored to a pin 31 affixed to the web 23 of the adjacent rocker. The springs are adjusted so as to swing the rockers 21 to positions normal to the frame 11 as shown in Figures 2 and 3. In this position the rockers are above the wheels 19 and will not interfere with manipulation of the hand truck over level ground. The foot portions 24 of the rockers, as also shown in Figures 2 and 3 are arcuate and project beyond both sides of the web 23. The upper end of each foot portion 24 carries a laterally projecting pin 32 adapted to strike against the outer frame tubes 12 to limit upward swinging of the rockers. As shown in Figure 1 the rockers are mounted closely adjacent the outer tubes 12 and unless the pins 32 were provided the upper ends of the rockers could swing through the open frame to strike against goods carried thereon. The pins 32 on the other hand, will hold the rockers rearwardly from the front face of the frame.

In the downward swinging of the rockers the lower projecting portions of the feet 24 will clear the axle 18 and the rockers are free to swing in a downward direction until the web 23 thereof strikes the axle. No limiting pins are necessary for this downward swinging movement since the axle 18 will strike the web 23 before the lower ends of the feet 24 project through the front face of the frame 11.

The operation of the rockers in swinging the hand truck 10 over stairs, curbs or the like precipices is shown in Figures 5 and 6.

In Figure 5, the truck 10 shown in solid line is illustrated as being lowered from stair A to stair B. As shown, the truck is tilted so that the wheels 19 will roll over the edge C of the tread of stair A. As this occurs the lower ends of the feet 24 will engage the tread of the stair A. Further movement of the truck in the direction of the arrow shown in Figure 5 will swing the rockers 21 upwardly to the dotted line position thereby swinging the truck about the axis of the rocker shaft 20 and supporting the truck during this swinging movement so that the wheels 19 will be spaced from the riser between the stairs A and B. The truck will be supported by the rockers until the wheels 19 engage the stair B whereupon the wheels again carry the load of the truck. As the truck is moved forwardly on the tread of the stair B the foot 24 of the rocker will be moved away from the stair tread A and the springs 28 will move the rockers back to their neutral position which is normal to the plane of the frame 11. The rockers are then in a position to engage the front edge of the tread of the stair B as the truck is lowered from the stair B.

As shown in Figure 6, the truck 10 in solid line has the wheels 19 riding on the tread of the stair B. The truck is tilted so that the top end portions of the rocker feet 24 will engage the front edge C of the stair A. As the truck is pulled upwardly the rockers will support the truck and swing rearwardly to the dotted line position. In so swinging the truck is raised to move the wheels 19 up to the level of the tread of stair A whereupon the wheels will engage this tread to support the truck and permit the springs to swing the rockers back to their neutral position from their downwardly tilted position dotted in Figure 6. It will again be noted that in this lifting operation the riser between the stairs B and A is not engaged by either the rocker or the wheels and is therefore not damaged. In the event that the stairway is provided with nosings which project forwardly from the riser it is impossible for the wheels or lockers to engage the riser.

From the above description it will therefore be understood that this invention provides a hand truck or cart which will rock over curbs, stairs and the like on swinging supports which protect both the truck and the supporting surfaces from impact damage such as commonly occurs in manipulation of hand trucks.

I claim as my invention:

A hand truck which comprises a generally rectangular frame having spaced parallel side tubes, a support plate secured to said tubes at one end thereof to form a supporting shelf for material to be carried by the truck, a pair of depending plates secured to the side tubes adjacent said support plate, said pair of plates carrying a transverse axle in spaced relation from the side tubes, truck wheels mounted on said axle adjacent the support plates, a second axle carried by said pair of plates, rockers having hubs rotatably mounted on said second axle, arms on said rockers extending from said hubs, arcuate feet portions on said arms adapted to swing around the first axle, stop pins on said arcuate feet adapted to engage the side tubes to prevent the rockers from projecting through the body, spirally coiled springs surrounding said second axle, each spring being mounted on said second axle adjacent a rocker hub and having inner and outer ends respectively anchored to the second axle and to the rocker arms, said spiral springs being the sole means for biasing said rockers to a neutral position away from said wheels and accommodating swinging movements of the rockers from said neutral position to allow the rocker feet to carry the truck over curbs and the like.

References Cited in the file of this patent

UNITED STATES PATENTS

| 857,696 | Weinstein | June 25, 1907 |
| 1,712,485 | Tokita | May 14, 1929 |
| 2,243,915 | Mueller | June 3, 1941 |
| 2,612,379 | Vogel | Sept. 30, 1952 |

FOREIGN PATENTS

| 185,067 | Great Britain | Aug. 31, 1922 |